(12) United States Patent
Bose (10) Patent No.: US 8,873,888 B2
(45) Date of Patent: Oct. 28, 2014

(54) BICUBIC DOWNSAMPLING IN A CONSTRAINED ENVIRONMENT

(75) Inventor: Shiladitya Bose, Kolkata (IN)

(73) Assignee: Adobe Systems Incorporated, San Jose, CA (US)

( * ) Notice: Subject to any disclaimer, the term of this patent is extended or adjusted under 35 U.S.C. 154(b) by 105 days.

(21) Appl. No.: 13/556,045

(22) Filed: Jul. 23, 2012

(65) Prior Publication Data

US 2014/0023294 A1    Jan. 23, 2014

(51) Int. Cl.
*G06K 9/32* (2006.01)

(52) U.S. Cl.
USPC .......................................... 382/299

(58) Field of Classification Search
CPC ...... G06K 15/02; G06T 1/20; G09G 2340/02; G09G 2340/0407; H04N 1/40068; H04N 5/74; H04N 19/00424; H04N 19/0046; H04N 19/00478; H04N 19/00781; H04N 19/0089; H04N 19/00903; H04N 19/757
See application file for complete search history.

(56) References Cited

U.S. PATENT DOCUMENTS

| | | | | |
|---|---|---|---|---|
| 6,782,132 | B1 * | 8/2004 | Fogg | 382/232 |
| 7,496,236 | B2 * | 2/2009 | Fogg | 382/233 |
| 8,000,562 | B2 * | 8/2011 | Morales et al. | 382/299 |
| 8,045,827 | B2 * | 10/2011 | Morales et al. | 382/299 |

* cited by examiner

*Primary Examiner* — Jose Couso
(74) *Attorney, Agent, or Firm* — Shook, Hardy & Bacon, L.L.P.

(57) ABSTRACT

An system is described for managing bicubic downsampling in a constrained environment. The system may be configured to detect a request for a destination image, access a read-copy pattern for the ratio of downsampling, access the source image, and generate the destination image using the source image and the read-copy pattern.

20 Claims, 8 Drawing Sheets

BICUBIC DOWNSAMPLING IN A CONSTRAINED ENVIRONMENT

TECHNICAL FIELD

This application relates to the technical fields of software and/or hardware technology and, in one example embodiment, to system and method to manage downsampling in a constrained environment.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Downsampling of digital images is a very important use case for applications running on smaller touch devices like Smart Phones, Tabs, iPADs, etc., as these devices have capabilities to handle images of modest dimensions due to the constrained environment prevalent on these devices. The constrained environment is mainly due to the limited hardware resources available on these devices compared to desktop computer systems, on which most image processing applications are tuned to run. Bicubic downsampling, which is one of the smoothest form of geometrical downsampling, is difficult to implement in such constrained environment, as it is a computationally intensive algorithm that is not deemed feasible for real time rendering on the web.

It is a common practice to store multiple resolutions of a high quality image especially in applications targeted towards the cloud. This is done to improve the user experience by rendering images of resolutions that are appropriate for screens of various sizes. The downside of this approach has always been the additional storage space required to store the multiple resolutions of the same image.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Bicubic downsampling of images is a resource greedy operation. The existing solutions in the constrained environment of the touch devices (e.g., tablets, pads, smart phones, etc.) perform poorly due to these limitations. In some embodiments, the techniques described herein include managing bicubic downsampling in a constrained environment in a way that facilitates image downsampling that results in quality downsampled images and good performance by means of adopting a cache friendly model.

The techniques described herein make it possible to perform downsampling in real time without considerable degradation in user experience, while removing the necessity to store multiple resolutions of the same image that may contribute to considerable savings in storage space requirements.

In one embodiment, a fast bicubic downsampling method is provided, which manages downsampling in tiles in a cache-friendly way by pre-computing and storing a read-copy pattern for any of the requested downsampling ratios. A read-copy pattern, in one example embodiment, is governed only by the associated downsampling ratio and is independent of the actual image that is being downsampled. The database identification value (id) of the record containing the read-copy pattern may be stored in the metadata of the full-size image, instead of storing images of multiple resolutions for the same full-size image. The record for the read-copy pattern can be stored optimally as is described further below. It will be noted that, while pre-calculating and storing a copy-read pattern for a certain downsampling ratio may eliminate the need for storing a respective downsampled version of the original image, the downsamples versions of the original image may still be generated in advance and stored, e.g., if a user so desires.

In one embodiment, the method described herein may be utilized beneficially to contribute to solving the following three problems together for a computing device: space, speed, and quality. With respect to space, the system and method to manage downsampling in a constrained environment attempts to reduce its memory requirement. With respect to quality, the system and method to manage downsampling in a constrained environment facilitates high quality of downsampled images (e.g., the quality of downsampled images generated by Adobe® Photoshop® application). With respect to speed, the system and method to manage downsampling in a constrained environment may be used to facilitate a faster pace of image processing by being cache-friendly. Though the described method is useful in improving bicubic downsampling on, e.g., a touch tooling device, it can also be used beneficially on a desktop computing device, with or without modification.

Example method and system to manage downsampling in a constrained environment may be described with reference to a network environment illustrated in FIG. 1. The network environment 100 may include one or more computer systems, such as client computer systems 110 and 120 and a server computer system 140. The server computer system 140 and the client computer systems 110 and 120 may be in communication with each other via a communications network 130. The communications network 130 may be a public network (e.g., the Internet, a wireless network, a public switched telephone network (PSTN), etc.) or a private network (e.g., LAN, WAN, Intranet, etc.).

Figure 1:
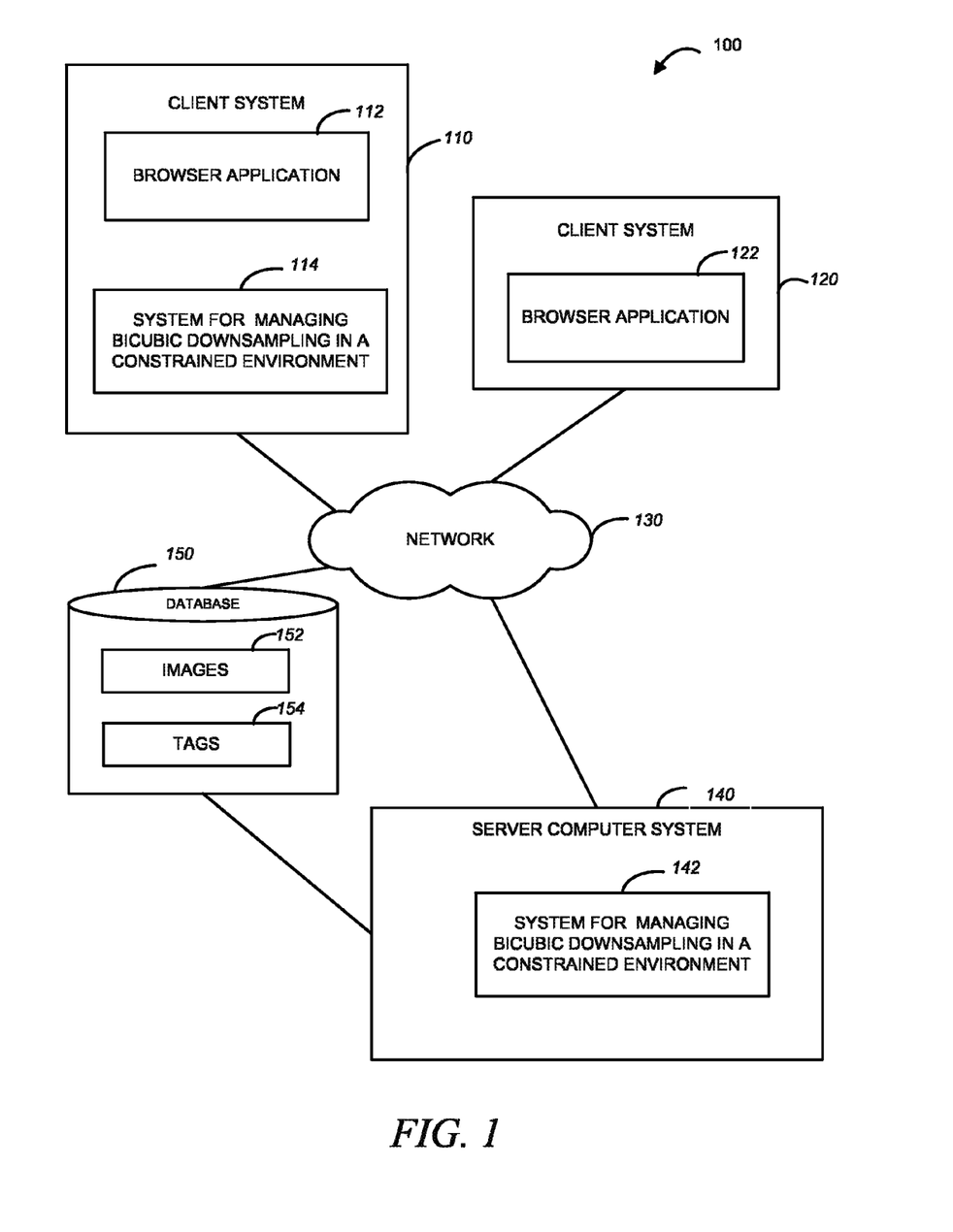
FIG. 1 is a block diagram showing a network environment within which a method and system to manage downsampling in a constrained environment may be implemented, in accordance with an example embodiment.

As shown in FIG. 1, the server computer system 140 hosts a system to manage downsampling in a constrained environment 142. The system to manage downsampling in a constrained environment 142 may be configured to detect a request for a destination image of a resolution associated with a certain downsampling ratio and a source image, access a read-copy pattern for the ratio, access the source image, and generate the destination image using the source image and the read-copy pattern. The destination image is thus a downsampled version of the source image, the destination image having a resolution identified by the ratio of downsampling. The read-copy pattern may be retrieved from the database 150.

The system to manage downsampling in a constrained environment 142 may also be configured to detect a new image being uploaded by a user and generate one or more read-copy patterns for respective ratios of downsampling.

As will be described in further detail below, the generating of a read-copy pattern for a certain ratio of downsampling comprises utilizing an operation buffer, a first source buffer, and a second source buffer. A read-copy pattern may be used during the process of creating a downsampled version of a source image to perform the following operations: fill the operation buffer with data from the first source buffer and the second source buffer, and refill the first source buffer and the second source buffer when the first source buffer and the second source buffer are emptied.

In one embodiment, the system to manage downsampling in a constrained environment 142 may be configured to determine a size of the source image and a size of the destination image, determine a number of rows in the source image to be used in determining a destination row in the destination image (where a block from the source image comprises the number of rows), determine a number of blocks in the source image, map the block to one of the first source buffer and the second source buffer for each block in the source image; and map each row in the source image to a row in one of blocks in the source image.

The original images and the records containing copy-read patterns associated with respective downsampling ratios may be stored in a repository accessible to the system to manage downsampling in a constrained environment, e.g., in a database 150 that stores images 152 and copy-read patterns 154.

The system to manage downsampling in a constrained environment 142 may be a web application accessible by the client computer systems 110 and 120 via respective browser applications 112 and 122 executing on the client computer systems 110 and 120. In some embodiments, a system to manage downsampling in a constrained environment may reside at a client computer system, such as, e.g., the system to manage downsampling in a constrained environment 114 that resides on the client computer system 110. The system to manage downsampling in a constrained environment 114 that resides on the client computer system 110 may be configured to operate in the same or similar manner as the system to manage downsampling in a constrained environment 142 residing on the server system 140. An example system to manage downsampling in a constrained environment may be discussed with reference to FIG. 2.

Figure 2:
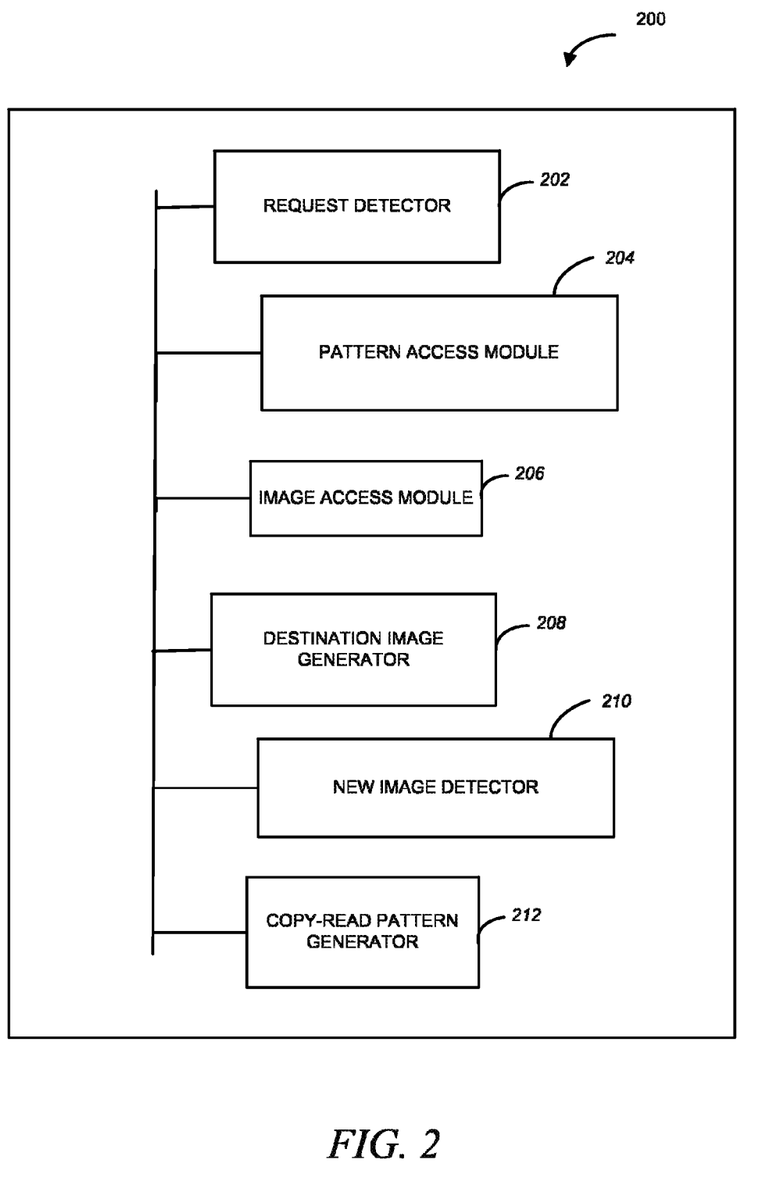
FIG. 2 is a block diagram illustrating a system to manage downsampling in a constrained environment, in accordance with an example embodiment.

FIG. 2 shows a block diagram illustrating a system 200 to manage downsampling in a constrained environment, according to one example embodiment. As shown in FIG. 2, the system 200 includes a request detector 202, a pattern access module 204, an image access module 206, and a destination image generator 20. The request detector 202 may be configured to detect a request for a destination image, where the destination image is a downsampled version of a source image, and where the destination image is to have a resolution identified by a ratio of downsampling. The pattern access module 204 may be configured to access a read-copy patter for the ratio of downsampling that was previously stored in a database. The image access module 206 may be configured to access the source image. The destination image generator 208 may be configured to generate the destination image using the source image and the read-copy pattern. In one embodiment, the destination image generator 208 utilizes an operation buffer, a first source buffer, and a second source buffer, as will be described in detail further below and uses the read-copy pattern to fill the operation buffer with data from the first source buffer and the second source buffer and to refill the first source buffer and the second source buffer when the first source buffer and the second source buffer are emptied.

Also shown in FIG. 2 are a new image detector 210 and a read-copy pattern generator 212. The new image detector 210 may be configured to detect the source image being (or having been) uploaded by a user. The read-copy pattern generator 212 may be configured to generate read-copy patterns for different ratios of downsampling. The read-copy pattern generator 212, in one example embodiment determines a size of the source image and a size of the destination image, determines a number of rows in the source image to be used in determining a destination row in the destination image, a block from the source image comprising the number of rows, determines a number of blocks in the source image, maps the block to one of the first source buffer and the second source buffer for each block in the source image, and maps each row in the source image to a row in one of blocks in the source image. The read-copy pattern generator 212 may be also configured to define a structure for storing the read-copy pattern. Various operations performed by the system 200, according to an example embodiment, may be discussed with reference to FIG. 3 and FIG. 4.

Figure 3:
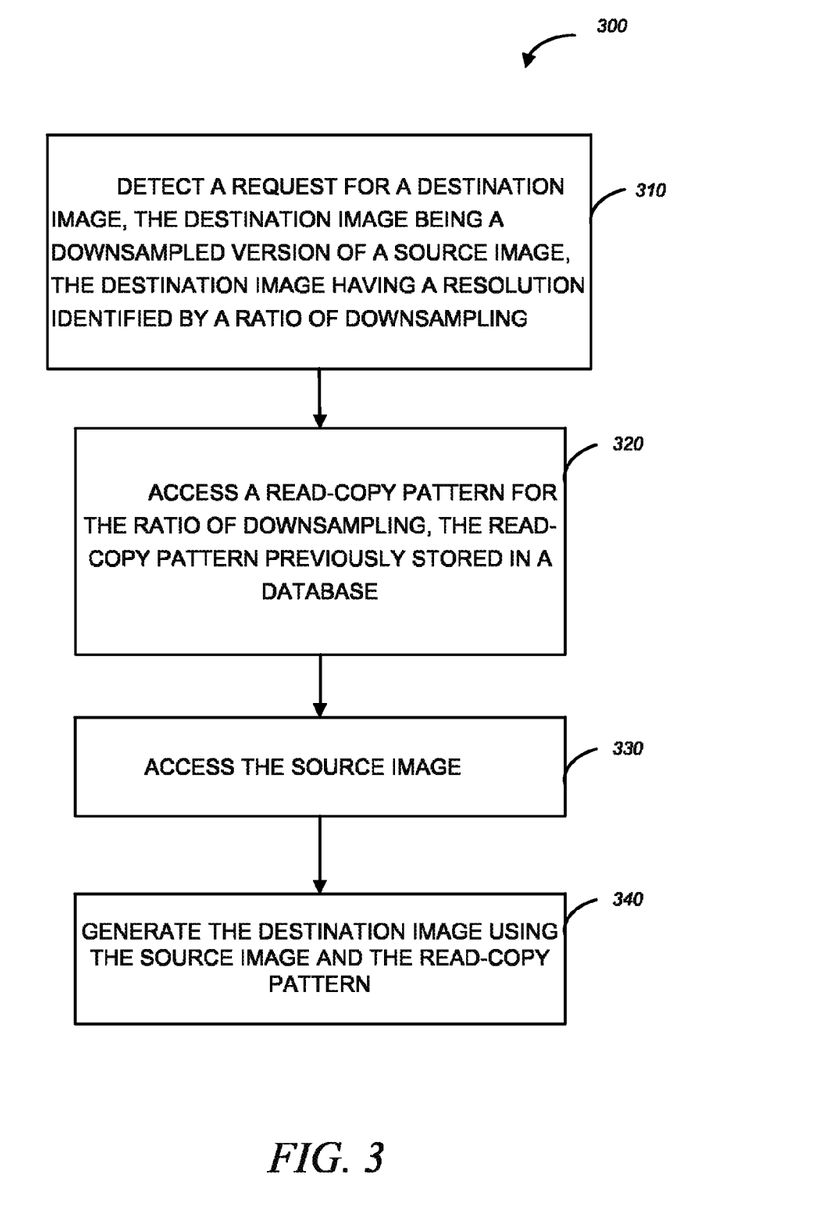
FIG. 3 is a flow chart illustrating a method to process a request for a destination image of a certain resolution, in accordance with an example embodiment.

FIG. 3 is a flow chart illustrating a method 300 to process a request for a destination image of a certain resolution, in accordance with an example embodiment. The method 300 may be performed by processing logic that may comprise hardware (e.g., dedicated logic, programmable logic, microcode, etc.), software (such as run on a general purpose computer system programmed to perform particular functions pursuant to instructions from program software or on a dedicated machine), or a combination of both. The processing logic, according to example embodiments, may reside in any of the modules shown in FIG. 2. The modules illustrated in FIG. 2 may be implemented as software, hardware, or a combination of both.

As shown in FIG. 3, the method 300 to process a request for a destination image of a certain resolution commences with operation 310, where the request detector 202 of FIG. 2 detects a request for a destination image, where the destination image is a downsampled version of a source image, and where the destination image is to have a resolution identified by a ratio of downsampling. The pattern access module 204 of FIG. 2 accesses a read-copy pattern for the ratio of downsampling that was previously stored in a database at operation 320. The image access module 206 of FIG. 2 accesses the source image at operation 330 and the destination image generator 208 of FIG. 2 generates the destination image using the source image and the read-copy pattern at operation 340.

Figure 4:
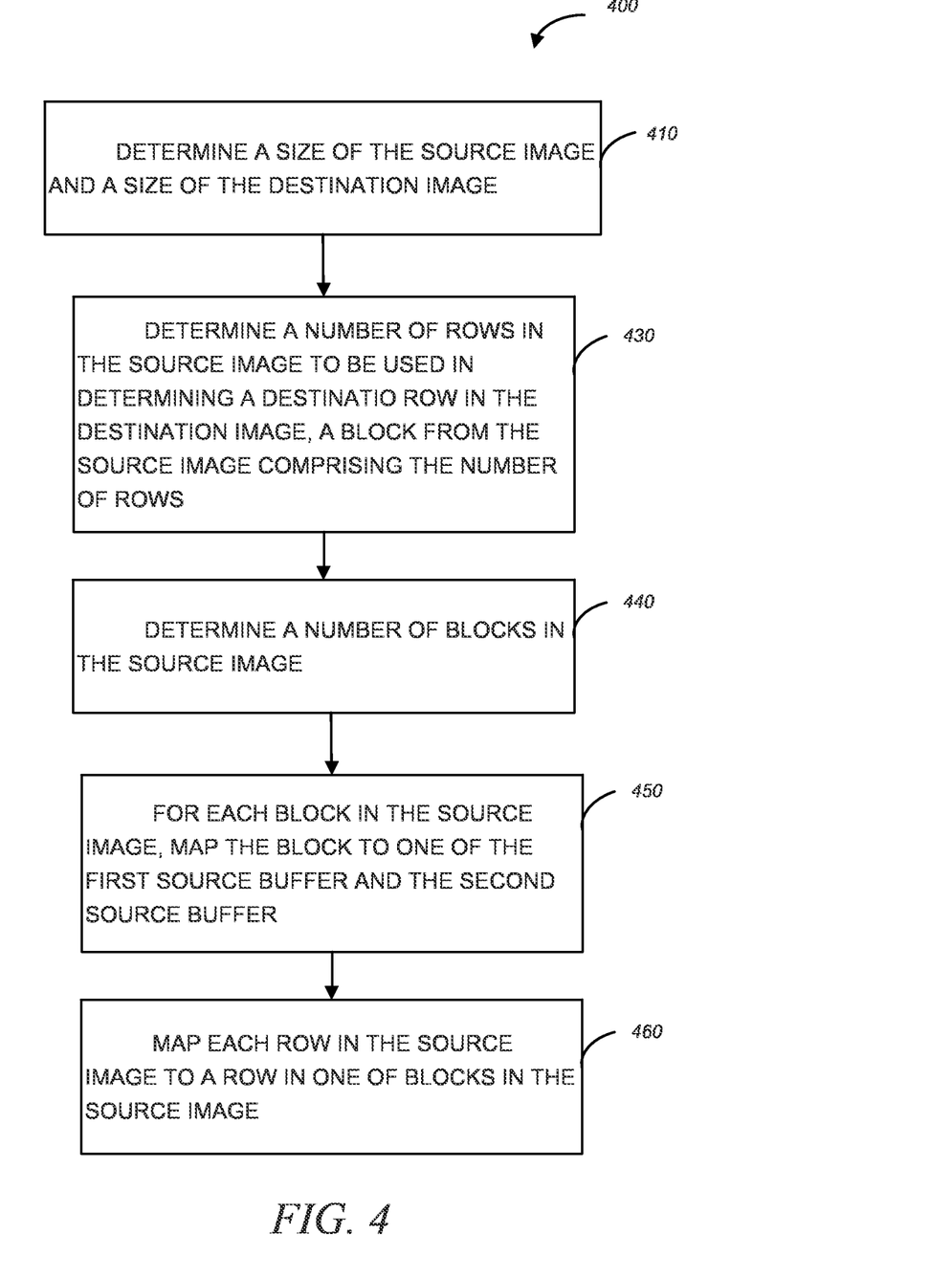
FIG. 4 is a flow chart illustrating a method to create a read-copy pattern, in accordance with an example embodiment.

FIG. 4 is a flow chart illustrating a method 400 to create a read-copy pattern, in accordance with an example embodiment. The method 400 may be performed by processing logic that may comprise hardware (e.g., dedicated logic, programmable logic, microcode, etc.), software (such as run on a general purpose computer system programmed to perform particular functions pursuant to instructions from program software or on a dedicated machine), or a combination of both. The processing logic, according to example embodiments, may reside in any of the modules shown in FIG. 2.

As shown in FIG. 4, the method 400 to process a request for a destination image of a certain resolution commences with the new image detector 210 of FIG. 2 detecting the source image being (or having been) uploaded by a user and the read-copy pattern generator 212 of FIG. 2 generating read-copy patterns for different ratios of downsampling (not shown). At operation 410, the read-copy pattern generator 212 of FIG. 2 determines the size of the source image and the size of the destination image, determines the number of rows in the source image to be used in determining a destination row in the destination image at operation 420, determines a number of blocks in the source image at operation 430, maps the block to one of the first source buffer and the second source buffer for each block in the source image at operation 440, and maps each row in the source image to a row in one of blocks in the source image at operation 450.

Example Bicubic Downsampling Method

Below is the description of downsampling in tiles while supporting variable kernel width. In one embodiment, the kernel for bicubic downsampling is defined as follows:
1. horizontal downsampling: Number of pixels in a row of the source image needed to obtain a pixel in the corresponding row of the destination image (downsampled image).
2. vertical downsampling: Number of rows of the source image needed to obtain a row of the destination image (downsampled image). The size of the kernel is directly proportional to the downsampling ratio. To obtain good quality bicubic downsampling it is beneficial to support a variable length kernel. To obtain cache optimized downsampling it beneficial to downsample in tiles in the vertical direction (along the height of the image).

For the purposes of this description, a digital image (also referred to as merely "image") is a rectangular grid of pixels having a specified width and height. The kernel width for bicubic interpolation is typically four times the downsampling ratio. For example, suppose the following equations describe parameters of the source image and the downsampling ratio.

orig_height=the height of the image before downsampling.

downsampled_height=the height of the image after downsampling downsampling_ratio=(orig_height/downsampled_height)=5

In this case, the kernel width for bicubic downsampling will be 4×5=20. This means 20 rows of source data (original image) are used to obtain a single row of the destination data (downsampled image). Further, the set of 20 rows of source data needed to obtain the first row of destination data is not mutually exclusive from the set of 20 rows needed to obtain the second row of destination data. This means that (1) if src_start_1 and src_start_1+20 are the start and end row numbers of the source image needed to obtain the first row of destination image and (2) src_start_2 and src_start_2+20 are the row numbers needed to obtain the second row of destination image, then, src_start_1<src_start_2<src_start_1+20<src_start_2+20. A sliding window model may be utilized, where the sliding window is the shifting kernel (shifting along the height/rows of the image) on the source image as the downsampling process is taking place to obtain each destination row of the destination image. As it may be beneficial to support variable kernel size, which is governed by the downsampling ratio, this window is of variable size depending on the downsampling ratio.

In order to support the above-referenced model in a constrained environment, such as, e.g., the touch devices, method and system to manage bicubic downsampling uses a three buffer model. The three buffers are described as follows.
1. operation_buffer: This is a rectangular buffer of,
   width=width of source image
   height=the kernel size needed for vertical downsampling.
   (So on downsampling the rows in the operation buffer, a single row of the destination image is being obtained.)
2. src_buffer1 (first source buffer).
3. src_buffer2 (second source buffer).
   These buffers may be buffers of equal that are used to read the data in blocks/tiles from a source image. For example, we the source buffers may be of size width=src_image_width and height=64. If the kernel size is 4×downsampling_ratio, these buffers can then support downsampling ratios between 0 and 16. (For ratios between 16 and 32 the buffer size is 128 rows and so on).

The following steps describe how the sliding kernel is implemented using the above three buffer model.

1. For each destination row we copy over number of bytes equal to the operation buffer size (width of source image*the kernel size needed for vertical downsampling) from the src_buffer that contains the requesite rows of data from the source image.
2. As the kernel slides there comes a stage when the kernel slides across the current src_buffer and lies partially in the current srcBuffer and partially in the next src buffer. When such an event happens, the next src buffer is populated with the next 64 rows of the src image and a part of the data for the operation buffer is fetched from the current src buffer and the remaining part from the next src buffer. This process continues till we have the complete downsampled image (all rows of the destination).

Thus, by adopting the three buffer model it may be possible to achieve downsampling via tiling and also good quality downsampling by supporting variable kernel sizes (kernel size appropriate for a ratio). The tiling is automatically cache friendly thus contributing to improved performance.

In order to manage complex book-keeping associated with the tree buffer model to maintain the consistency of the buffers as they slide across the rows of the source image, as approach may be taken as described below.

For every destination row the operation buffer is being filled. Filling up of the operation buffer gives rise to the following cases. If all rows of the operation buffer lie in the same source buffer, these rows are being copied from the source buffer to the operation buffer. If s some rows of the operation buffer lie in the first source buffer while the remaining lie in the other source buffer. In this case we need to copy over the data that lies in the first buffer is being copied over, the second source buffer is being filled up, and the remaining rows are being copied over. If the second source buffer is already filled, the rows required to fill the operation buffer are being copied over. The algorithm also keeps track of the sliding kernel, which may be split across both of the source buffers.

Figure 5:
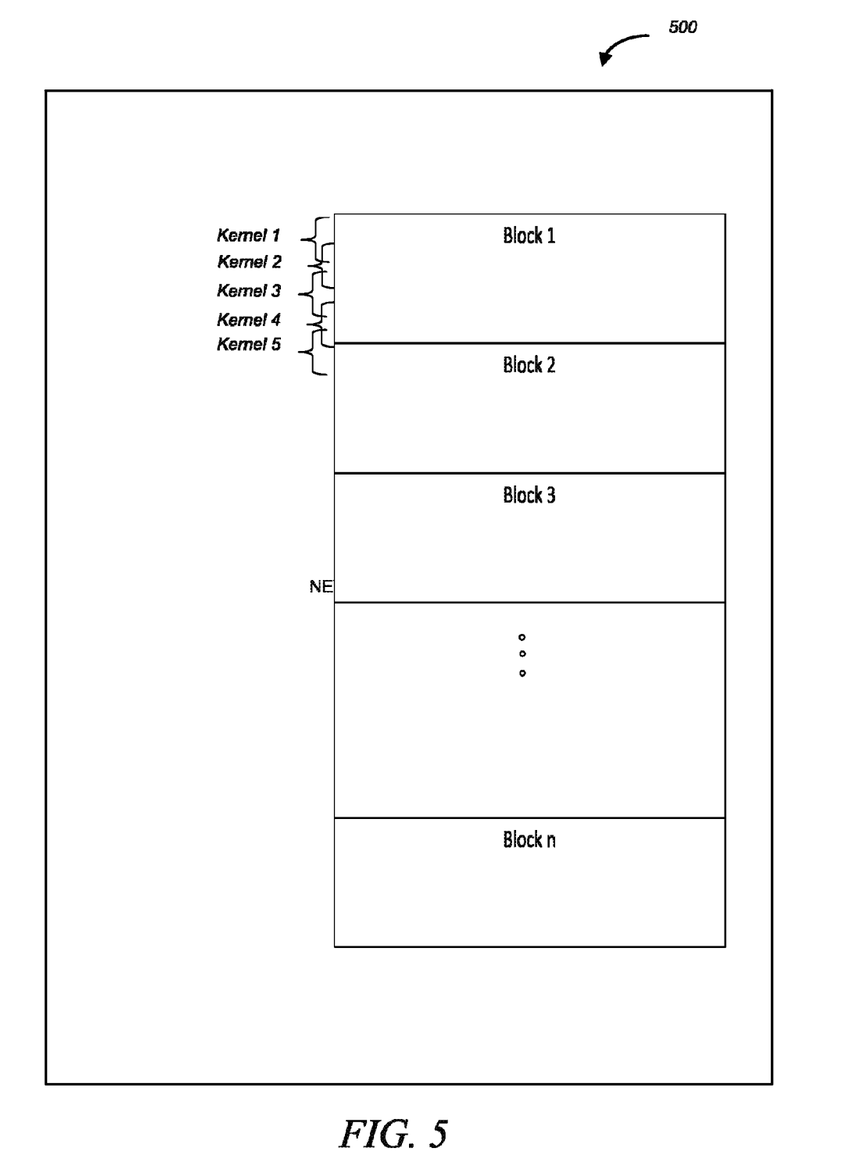
FIG. 5 is a diagram of a source image comprising n blocks, in accordance with an example embodiment.
Figure 6:
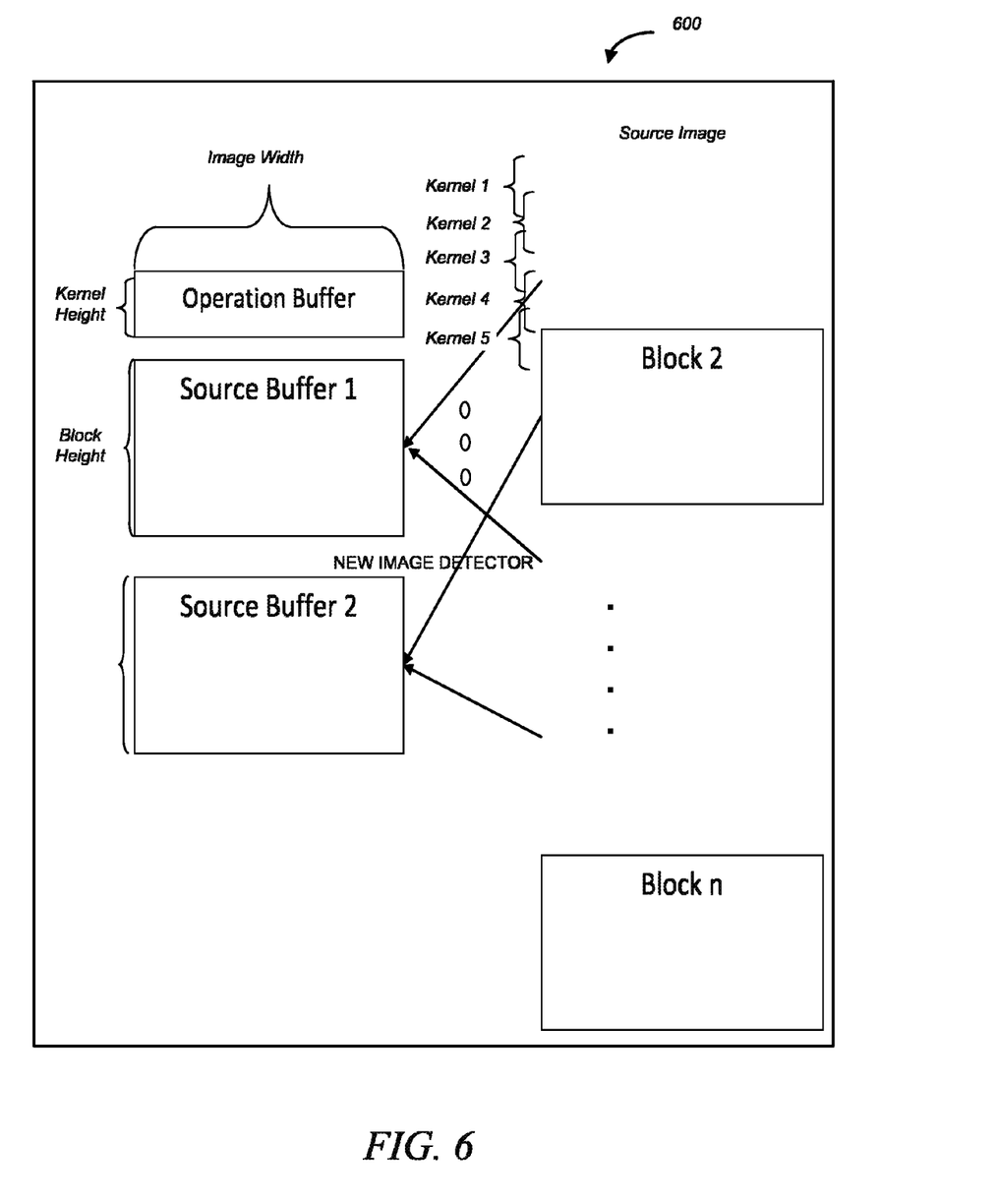
FIG. 6 is a diagram illustrating mapping of blocks from a source image blocks to source buffers, in accordance with an example embodiment.
Figure 7:
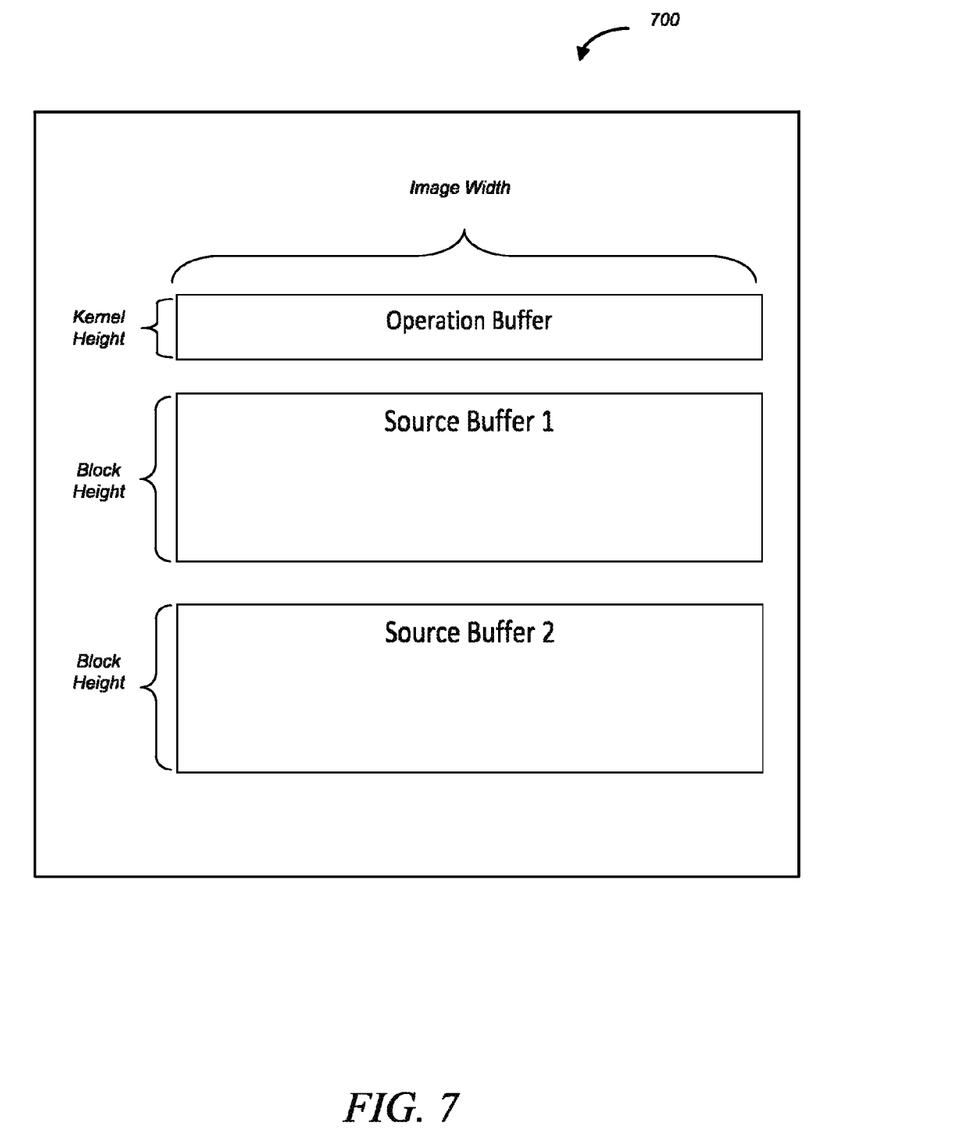
FIG. 7 is a diagram 700 representing blocks in an example source image, in accordance with an example embodiment.

In one example embodiment, a method for managing bicubic downsampling may pre-calculate a copy-read pattern that can then be used for keeping track of the various actions needed to fill the operation buffer with data from the source buffers and refilling the source buffers with data from the source image, when the source buffers are completely used. An example source image 500 comprising n blocks is shown in FIG. 5. Also shown in FIG. 5 is variable kernel represented as "Kernel 1" "Kernel 2," "Kernel 3," "Kernel 4," and "Kernel 5." A diagram 600 illustrating mapping of blocks from a source image blocks to source buffers is shown in FIG. 6. A diagram 700 representing blocks in an example source image is shown in FIG. 7. The pre-calculated copy-read may then be cached for later use when the actual downsampling of the source image takes place. As mentioned above, the copy-read pattern is dependent on the ratio between the source and the destination image and not on any particular source image. The evaluation of the book keeping in isolation (decoupled from the actual downsampling operation) is a fast and lightweighttoperation that can be accomplished in real time when the downsampler is initialized.

The following description details how this pre-calculation is accomplished and what impact does this have on the actual downsampling operation. For the purposes of this description, all indices (block number, row number, etc.) start from 0.

a)
Once the size of the source image and the required size of the destination image is known, it is common practice to calculate the start and end row of the source image for a kernel needed to obtain a destination row. The following explains the idea:

destination_row(i)<=bicubic_downsample(kernel (source_start_row(i),source_end_row(i))

source_start_row(i)=start row number in the source image to obtain destination row i source_end_row(i)=end row number in source image to obtain destination row i the kernel spans from source_start_row(i) to source_end_row(i)

b)
If we are tiling in blocks of n rows of the source image and our pair of source buffers are of n rows, we can calculate the total number of blocks in the source image by the following simple equation, $$\text{num\_blocks\_in\_source\_image} = (\text{source\_image\_height}/n) \quad (1)$$

c)
Now given a block of the source image, we can map it to one of our source buffers using the following equation, $$\text{source\_buffer\_index} = (\text{source\_image\_block\_num} \% 2) \quad (2)$$

here, source_image_block_num=block number in the source image we take mod by 2 as there are a couple of source buffers.

d)
Now each row of the source image can be mapped to a row in a block as follows, $$\text{row\_in\_a\_source\_block} = (\text{source\_image\_row\_num} \% n) \quad (3)$$

The above also holds for row_in_a_source_buffer so, row_in_a_source_buffer=row_in_a_source_block e)
Given a source_image_row, we can easily tell which source image block does it belong, $$\text{source\_image\_block\_num\_for\_row\_i} = (\text{source\_image\_row\_num}/n) \quad (4)$$

f)
The structure that caches the result of the pre-computation of the copy-read pattern for each destination row is defined.

An example structure—referred as "opset" for the purposes of this description—that caches the result of the pre-computation of the copy-read pattern for each destination row is shown in Table 1 below.

TABLE 1

```
struct opset
{
// here BYTEOP is a function pointer which has the following signature
//
// typedef void (*BYTEOP) (unsigned int, unsigned int, void*, void*)
//
// this function ptr can point to two types of operations:
//
// copy : this is a method which copies required number of bytes from
the source_buffer1 or source_buffer2 to the operation_buffer
// read : this is a method which reads required number of rows/bytes
from the source image to source_buffer1 or source_buffer2.
// the read function could also be coupled with a image decoder and can
```

TABLE 1-continued ask the decoder to read the required number of rows into the appropriate source_buffer
  BYTEOP function;
  // numUnitsToCopy has the following two interpretations based on what is the type of operation the above function ptr is pointing to.
  // copy : numUnitsToCopy tells us how many bytes to copy from source_buffer1 or source_buffer2 to the operation_buffer
  // read : numUnitsToCopy tells us how many rows of data to be read from source_image or the image decoder
  unsigned int numUnitsToCopy;
  // This parameter is only important for the copy operation.
  // this tells us at what byte offset should we start copying from source_buffer1 or source_buffer2
  unsigned int offset;
  // copy : In case of the copy operation src points to the source_buffer1 or source_buffer2 (whichever is applicable)
  // read : In case of the read operation src may point to the image decoder or the source image,
  void* src;
  // copy : In case of the copy operation dest points to the operation_buffer
  // read : In case of the read operation dest points to the source_buffer1 or source_buffer2 (whichever is applicable)
  void* dest;
}

For each destination row the number of opsets is >=1 and <=3, so the result of the pre-computation of the read copy pattern for each destination row can be depicted by a matrix shown in Table 2 below.

TABLE 2 destination_row[0] -> opset01
|
destination_row[1] -> opset11
|
destination_row[2] -> opset21
|
|
destination_row[i] -> opseti1 -> opseti2 -> opseti3
|
|
destination_row[n] -> opsetn1

The above matrix can be implemented using vectors. So for each destination row the vector is defined as vector<opset>opsetList. These vectors can be stored in a global vector vector<opsetList>opsetMatrix, where, opsetMatrix.size( )=num_rows_in_destination_image.

An example kernelRecord structure is shown below in Table 3

TABLE 3

```
struct kernelRecord
{
    unsigned nit startRow; // row in source image where the kernel for the destination row starts
    unsigned int endRow; // row in source image where the kernel for the destination row ends
}
```

An example algorithm for pre-computation of the read-copy pattern for each destination row described below.
The set of variables used in the example algorithm to pre-compute the read copy pattern is shown in Table 4 below.

TABLE 4 kernel_startRow: The row of source image where the kernal will start (see Fig.6.)
kernel_endRow: The row of source image where the kernel will end (see FIG. 6.)
kernel_size: The size of the downsampling kernel, kernel_endRow − kernel_startRow
start_block_number_for_kernel: The block number in source image where the start row of the kernel will lie ( see FIG. 6.)
end_block_number_for_kernel: The block number of the source image where the end row of the kernel will lie ( see FIG. 6.)
source_buffer_for_start_of_kernel: The source buffer id (can be 0 or 1) where the start row of the kernel will map while downsampling ( see FIG. 7.)
source_buffer_for_end_of_kernel: The source buffer id (can be 0 or 1) where the end row of the kernel will map while downsampling ( see FIG. 7.)
source_Buffer_Row_Num_To_Copy_From: The row number in the source buffer where a copy operation will start. The copy operation will copy a required number of rows from source buffer to operation buffer.
Num_Rows_To_copy: The number of rows to be copied from the source buffer to the operation buffer.
opset_list: A set of opsets for each destination row. The size of this list is always equal to the number of rows in the destination image
Last_block_Read_To_Source_Buffer[2]: { −1, −1}, The source image block number that was last read into source_buffer[0] and source_buffer[1] respectively. Initialized with −1.
Source_Data_Provider: Either a buffer holding the source image data or an image decoder. We will read the source image data in blocks
source_buffer[2]: Couple of source buffers ( see FIG. 5.)
operation_buffer[2]: Operation buffer ( see FIG. 5.)

The example pseudo-code for pre-computing the read copy pattern is shown in Table 5 below.

TABLE 5

```
opset_list Pre_Compute_Read_Copy_Pattern(rows_in_destination_image, kernelRecord)
{
    for(row = 0; row < rows_in_destination_image; row++)
    {
        kernel_startRow = kernelRecord[row].startRow;
        kernel_endRow   = kernelRecord[row].endRow;
        kernel_size     = kernel_endRow − kernel_startRow;
        start_block_number_for_kernel = Compute_Block_Number_For_Row(kernel_startRow);
        end_block_number_for_kernel = Compute_Block_Number_For_Row(kernel_endRow);
        source_buffer_for_start_of_kernel = Map_Block_Number_To_Source_Buffer_Id(start_block_number_for_kernel);
        source_buffer_for_end_of_kernel = Map_Block_Number_To_Source_Buffer_Id(end_block_number_for_kernel);
        if(Is_Block_Not_In_Source_Buffer(source_buffer_for_start_of_kernel, start_block_number_for_kernel))
        {
```

TABLE 5-continued

```
                // The required block will not be in the source buffer, we
will need to read in the block from the source image into the corresponding
source buffer
                    opset =
Create_Read_Opset(source_buffer_for_start_of_kernel,
start_block_number_for_kernel);
                    opset_list[row].add(opset);
                }
            if(Is_Block_Not_In_Source_Buffer(source_buffer_for_end_of_kernel,
end_block_number_for_kernel))
                {
                    // The required block will not be in the source buffer, we
will need to read in he block from the source image into the corresponding
source buffer
                    opset =
Create_Read_Opset(source_buffer_for_end_of_kernel,
end_block_number_for_kernel);
                    opsetList[row].add(opset);
                }
            if(start_block_number_for_kernel ==
end_block_number_for_kernel)
                {
                    // In this case the start and end of the kernel will lie in the
same block.
                    Source_Buffer_Row_Num_To_Copy_From =
Map_Kernel_Row_To_Source_Buffer_Row(kernel_startRow);
                    Num_Rows_To_Copy = kernel_size;
                    opset = Create_Copy_Opset(Num_Rows_To_Copy, // size
of kernel
        Source_Buffer_Row_Num_To_Copy_From,
                                0,
                                source_buffer_for_start_of_kernel
                                );
                    opsetList[row].add(opset);
                }
            else
                {
                    // the start row and end row of the kernel will lie in
different blocks
                    // hence will have to copy kernel_endRow –
kernel_startRow – Source_Buffer_Row_Num_To_Copy_From rows from the
first source buffer and
                    // the remaining rows from the second source buffer
                    // Record this prediction as a couple of copy opsets
                    Source_Buffer_Row_Num_To_Copy_From =
Map_Kernel_Row_To_Source_Buffer_Row(kernel_startRow);
                    Num_Rows_To_Copy = kernel_size –
Source_Buffer_Row_Num_To_Copy_From;
                    opset = Create_Copy_Opset(
                                Num_Rows_To_Copy,
Source_Buffer_Row_Num_To_Copy_From,
                                0,
                                source_buffer_for_start_of_kernel
                                );
                    opsetList[row].add(opset);
                    Num_Rows_To_Copy_2 = kernel_size –
Num_Rows_To_Copy; // remaining rows of the kernel
                    opset = Create_Copy_Opset(Num_Rows_To_Copy_2,
                                0,
                                Num_Rows_To_Copy,
                                source_buffer_for_end_of_kernel
                                );
                    opsetList[row].add(opset);
                }
        }
    }
// This method maps a rowNumber to a block number in a source image
Block_Number Compute_Block_Number_For_Row( Row_Number )
{
    return (Row_Number / blockSize_in_rows);
}
// This method maps a block number to a source buffer Id. We have a couple of
source buffers hence we take mod by 2 in the following method.
Source_Buffer_Id Map_Block_Number_To_Source_Buffer_Id ( blockNum )
{
    return (blockNum % 2)
}
```

TABLE 5-continued

```
Source_buffer_row Map_Kernel_Row_To_Source_Buffer_Row(kernel_row)
{
      kernel_row % kernel_size;
}
// Last_Block_Read_To_Source_Buffer[0] = The block number of source image
last read to source buffer 0
// Last_Block_Read_To_Source_Buffer[1] = The block number of source image
last read to source buffer 1
// This method returns true if the last block read in source buffer with id
source_buffer_for_start_of_kernel is not the same as
start_block_number_for_kernel
BOOL Is_Block_Not_In_Source_Buffer(source_buffer_for_start_of_kernel,
start_block_number_for_kernel)
{
      return
(Last_Block_Read_To_Source_Buffer[source_buffer_for_start_of_kernel] !=
start_block_number_for_kernel);
}
Opset Create_Read_Opset(source_Buffer_id, block_number_to_read)
{
      opset tempopset;
      tempopset.function = read;
      tempopset.numUnitsToCopy = kernel_size; // kernel size also = number
of rows in operation buffer
      tempopset.offset = 0; // ignore
      tempopset.srcBuffer = Source_Data_Provider; // either a image decoder
or an image buffer, from which we read data block by block.
      tempopset.destBuffer = source_Buffer[source_Buffer_id];
      Last_Block_Read_To_Source_Buffer[source_Buffer_id] =
block_number_to_read;
      return tempopset;
}
Opset Create_Copy_Opset(Num_Rows_To_Copy,
Start_Row_In_Source_Buffer_For_Copy, Start_Row_In_Dst_Buffer,
Source_Buffer_Id)
{
      Opset tempopset;
      tempopset.function = copy;
      tempopset.numUnitsToCopy = Num_Rows_To_Copy; // in rows
      tempopset.offset = Start_Row_In_Source_Buffer_For_Copy; // in rows
      tempopset.srcBuffer = source_buffer[Source_Buffer_Id];
      tempopset.destBuffer = operation_buffer + Start_Row_In_Dst_Buffer;
      return tempopset;
}
```

Pre-computation of the opsets transforms the actual resample implementation into a simple implementation abstracting out the complexity of the underlying tiling and allowing to have a kernel of variable width.

An example resampling function is shown in Table 6 below.

TABLE 6

```
void ActualBidirectionalResample( )
{
      for(unsigned int row = 0; row < destination_rows; row++)
      {
            // execeute the operations specified by the pre-computed opsets
            // Once the opsets for the given destination row are
executed the operation_buffer and source_buffers are
            // guaranteed to be in consistent state. The resampler just
needs to operate on the operation_buffer data and
            // put the ouput in the destination buffer
            opsetList = opsetMatrix[row];
            for(int i = 0; i < opsetList.size( ) i++)
            {
                  opset = opsetList[i];
                  opset.function(opset.offset,
opset.numUnitsToCopy, opset.srcBuffer, opset.destBuffer);
            }
            CubicResampleHorizontal(
                              operationBuffer, // src
                              operationBuffer, // dst
                              );
```

TABLE 6-continued

```
            CubicResampleVertical(
                              operationBuffer, // src
                              dstBuffer, // dst
                              );
```

Recording the Pre-computed Read-copy Pattern for Bicubic Sub-sampling in a Database As described above, the speed of performing bicubic downsampling is significantly improved by pre-calculating the read-copy pattern needed to manage a cache friendly downsampling in tiles. Consequently, it becomes possible to avoid storing images of various resolutions when one or more pre-calculated copy-read patterns are available. A pre-calculated copy-read pattern may be provided for each requested downsampling ratio. For example, the read-copy pattern for downsampling from 2230 to 223 rows can be reused for the downsampling from 1440 to 144 rows.

Representing Opsets by Byte-field

An example opset structure for the rows of the destination image is shown in Table 7 below.

TABLE 7 destination_row[0] -> opset01
|
destination_row[1] -> opset11
|

TABLE 7-continued

```
destination_row[2] -> opset21
|
|
destination_row[i] -> opseti1 -> opseti2 -> opseti3
|
|
destination_row[n] -> opsetn1
```

Each opset may be represented by a five-byte, opset-byte-field. An example of the five-byte opset-byte-field capturing an opset is shown in Table 8 below.

TABLE 8

```
Byte1:
|B|O|d1|d2|X|X|X|X|
B = source buffer number, could be 0, 1
O = operation , 0 = read, 1 = copy
d1d2 = 00, there are zero opset-byte-field for this row following this
d1d2 = 01, there is one opset-byte-fieid for this row following this
d1d2 = 10, there are two opset-byte-field for this row following this
Byte 2: number of rows to copy / read, we can support 128 rows tile,
which would give a maximum downsampling
ratio of 1 / 32, which should be sufficient for all practical purposes.
Byte 3 : tile row number to start copy from.
Byte 4 and Byte 5:nNumber of reads that have happened before the
present tile, only needed to be stored for the first opset of a row.
```

This information may be used if only a part of an image is being downsampled.

A Database of Ratios and Opsets—Caching the Copy-read Pattern for a Ratio:

An example structure of a record in a database of ratios and opsets (referred to as the recordDB for the purposes of this description) is shown in Table 9 below.

TABLE 9

```
record {
id, // identifier
ratio, // downsampling ratio
record_data, // the set of opset-byte-fields for all rows encountered for the
largest sub-sampled image for
given ratio.
}
```

An example record_data field for a given ratio defined for a destination image (downsampled image) of n rows is shown below.

|opset-byte-field01|opset-byte-field11|opset-byte-field21| . . . |opset-byte-fieldi1|opset-byte-fieldi2| . . . |opset-byte-fieidn1|

Example operations for generating a copy-read pattern and using the copy-read pattern for generating an image of requested resolution is described below.

Step 1: User uploads Image I and we need to downsample to ratios R1, R2 . . . Rn.

Step 2: For each downsampling ratio Ri from R1 to Rn perform the following steps:

Step 2a: For ratio Ri check if the number of rows in the destination image downsampled from image I is greater than the number of rows stored in recordDB for ratio Ri. 'if yes, Step 2a1: Recalculate the records for ratio Ri. Using the algorithm for generating a copy-read pattern described above.

Step 2a2: Delete the entry for Ratio Ri in recordDB if it exists.

Step 2a3: Insert the newly calculated records for Ri.

Step 2b: Store the Id of the record for ratio Ri in the metadata of the image. (addition of the record id to the metadata of the image is described further below).

Step 3: Store the image updated with the metadata in the asset database.

Updating the Image with Metadata on the Ids of Records

Once respective ids of the records (that can be four-byte integers) for various downsampling ratios (R1, R2 . . . Rn) are known, these ids may be stored in the metadata of the source image. For example, for a source image in JPEG format, the ids can be stored as APP records. For or a source image in TIFF format, the ids can be stored in tags. The metadata may contain fields as shown below.

1) The ratio to downsample to.
2) The id of the record set in the Rdb.

Creating Images of Different Resolutions when a User Requests them

When a user requests an image of a certain resolution (identified by the ratio of downsampling), the system to manage bicubic downsampling loads the downsampling table from the record database for the particular ratio and downsamples and encodes the image, using the techniques described above.

Figure 8:
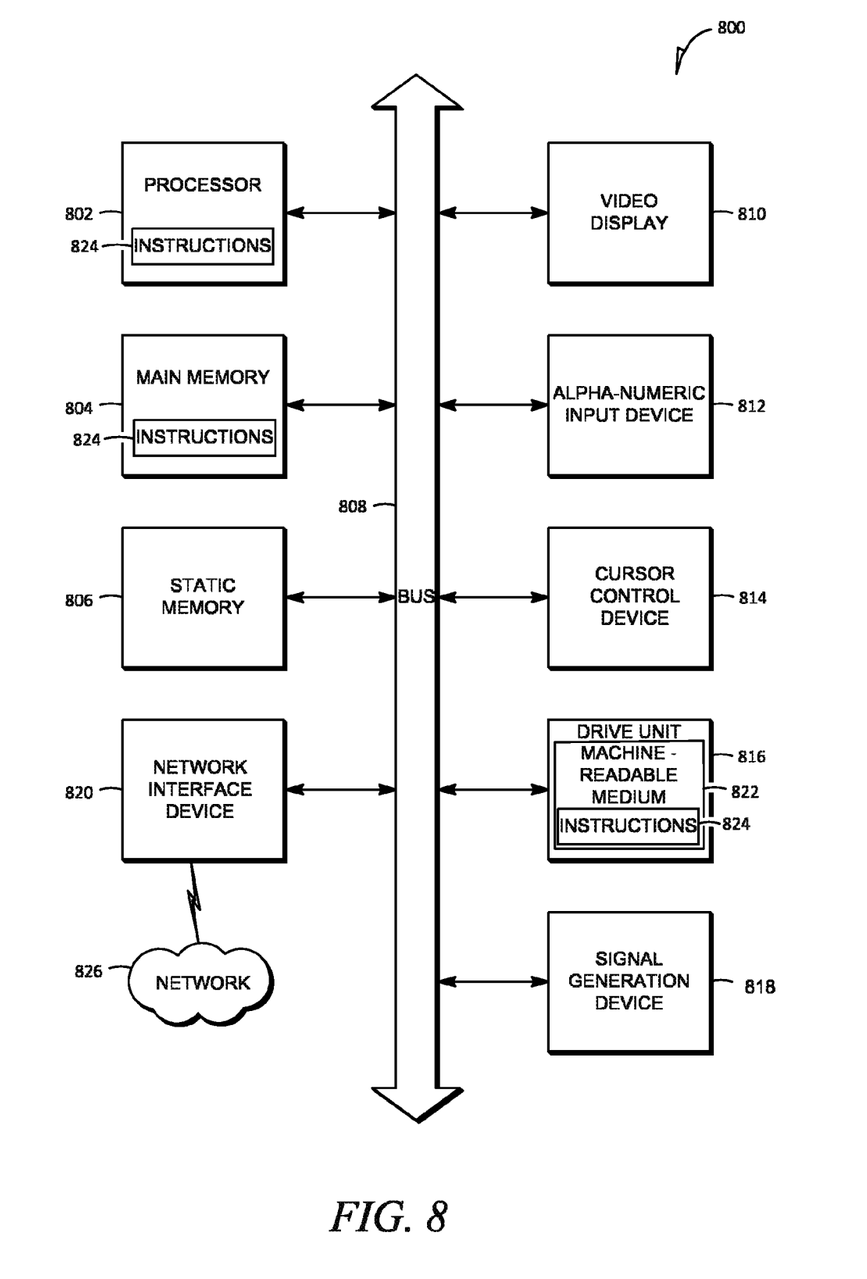
FIG. 8 is a diagrammatic representation of a machine in the example form of a computer system within which a set of instructions, for causing the machine to perform any one or more of the methodologies discussed herein, may be executed.

FIG. 8 is a diagrammatic representation of a machine in the example electronic form of a computer system 800 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) cursor control device 814 (e.g., a mouse), a disk drive unit 816, a signal generation device 818 (e.g., a speaker) and a network interface device 820.

The disk drive unit 816 includes a computer-readable (or machine-readable) medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820 utilizing any one of a number of well-known transfer protocols (e.g., Hyper Text Transfer Protocol (HTTP)).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention, or that is capable of storing or encoding data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
    detecting, utilizing one or more computing devices, a request for a destination image, the destination image being a downsampled version of a source image, the destination image having a resolution identified by a ratio of downsampling;
    accessing, utilizing the one or more computing devices, a read-copy pattern for the ratio of downsampling, the read-copy pattern based on a size of the source image and a size of the destination image and previously stored in a database;
    accessing, utilizing the one or more computing devices, the source image; and
    generating, utilizing the one or more computing devices, the destination image using the source image and the read-copy pattern.

2. The method of claim 1, comprising:
    detecting the source image being uploaded; and
    generating the read-copy pattern for the ratio of downsampling.

3. The method of claim 2 further comprising generating a read-copy pattern for each ratio of downsampling from a plurality of ratios of downsampling, the ratio of downsampling being one among the plurality of ratios of downsampling.

4. The method of claim 1, wherein the generating of the destination image comprises utilizing an operation buffer, a first source buffer, and a second source buffer.

5. The method of claim 4, wherein the read-copy pattern is to be used to:
    fill the operation buffer with data from the first source buffer and the second source buffer, and
    refill the first source buffer and the second source buffer when the first source buffer and the second source buffer are emptied.

6. The method of claim 5, wherein the generating of the read-copy pattern for the ratio of downsampling comprises:
    determining the size of the source image and the size of the destination image;
    determining a number of rows in the source image to be used in determining a destination row in the destination image, a block from the source image comprising the number of rows;
    determining a number of blocks in the source image;
    for each block in the source image, mapping the block to one of the first source buffer and the second source buffer; and
    mapping each row in the source image to a row in one of blocks in the source image.

7. The method of claim 6, comprising defining a structure for storing the read-copy pattern.

8. The method of claim 7, comprising representing the read-copy pattern as a matrix.

9. The method of claim 8, comprising implementing the matrix using vectors.

10. The method of claim 1, wherein the source image and the destination image are JPEG images.

11. A computer-implemented system comprising:
    a processor including:
        a request detector to detect a request for a destination image, the destination image being a downsampled version of a source image, the destination image having a resolution identified by a first ratio of downsampling;
        a pattern access module to access a read-copy pattern for the first ratio of downsampling, the read-copy pattern previously stored in a database and accessed upon identifying a size of the source image and a size of the destination image and upon identifying that a second ratio of downsampling associated with the read-copy pattern corresponds with the first ratio of downsampling associated with the destination image;
        an image access module to access the source image; and
        a destination image generator to generate the destination image using the source image and the read-copy pattern.

12. The system of claim 11, comprising:
    a new image detector to detect the source image being uploaded by a user; and
    a read-copy pattern generator to generate the read-copy pattern for the ratio of downsampling.

13. The system of claim 12, wherein the ratio of downsampling is from a plurality of ratios of downsampling, the read-copy pattern generator to generate a read-copy pattern for each ratio of downsampling from the plurality of ratios of downsampling.

14. The system of claim 11, wherein the destination image generator is to generate the destination image utilizing an operation buffer, a first source buffer, and a second source buffer.

15. The system of claim 14, wherein the read-copy pattern is to be used to:
    fill the operation buffer with data from the first source buffer and the second source buffer; and
    refill the first source buffer and the second source buffer when the first source buffer and the second source buffer are emptied.

16. The system of claim 15, wherein the read-copy pattern generator is to:
   determine the size of the source image and the size of the destination image; determine a number of rows in the source image to be used in determining a destination row in the destination image, a block from the source image comprising the number of rows:
   determine a number of blocks in the source image;
   for each block in the source image, map the block to one of the first source buffer and the second source buffer; and
   map each row in the source image to a row in one of blocks in the source image.

17. The system of claim 16, wherein the read-copy pattern generator is to define a structure for storing the read-copy pattern.

18. The system of claim 17, wherein the read-copy pattern generator is to represent the read-copy pattern as a matrix.

19. The system of claim 18, wherein the matrix is implemented using vectors.

20. A machine-readable non-transitory medium having instruction data to cause a machine to:
   detect a request for a destination image, the destination image being a downsampled version of a source image, the destination image having a resolution identified by a ratio of downsampling;
   access a read-copy pattern for the ratio of downsampling, the read-copy pattern previously stored in a database, wherein the read-copy pattern is accessed upon identifying a size of the source image and a size of the destination image and upon identifying that a second ratio of downsampling associated with the read-copy pattern corresponds with the first ratio of downsampling associated with the destination image;
   access the source image; and
   generate the destination image using the source image and the read-copy pattern.

* * * * *